United States Patent
Lee

(10) Patent No.: US 6,893,197 B2
(45) Date of Patent: May 17, 2005

(54) CAGED NUT ASSEMBLY WITH REINFORCING PROTRUSIONS

(75) Inventor: Christine Yingli Lee, Rochester, MI (US)

(73) Assignee: Newfrey LLC, Newark, DE (US)

( * ) Notice: Subject to any disclaimer, the term of this patent is extended or adjusted under 35 U.S.C. 154(b) by 37 days.

(21) Appl. No.: 10/281,681

(22) Filed: Oct. 28, 2002

(65) Prior Publication Data

US 2004/0081530 A1 Apr. 29, 2004

(51) Int. Cl.$^7$ ............................................. F16B 39/284
(52) U.S. Cl. ........................ 411/111; 411/462; 411/463
(58) Field of Search ........................ 411/111, 112, 171, 411/462, 463

(56) References Cited

U.S. PATENT DOCUMENTS

| | | | |
|---|---|---|---|
| 2,291,219 A | * | 7/1942 | Fontecilla ..................... 24/545 |
| 2,552,499 A | * | 5/1951 | Tinnerman ................. 411/112 |
| 2,595,830 A | * | 5/1952 | Demboske ................. 411/171 |
| 4,263,952 A | | 4/1981 | Kowalski |
| 4,440,535 A | | 4/1984 | Oehlke |
| 4,643,610 A | | 2/1987 | Bien |
| 4,729,706 A | | 3/1988 | Peterson et al. |
| 4,729,706 A | | 3/1988 | Peterson et al. |
| 4,768,907 A | | 9/1988 | Gauron |
| 4,790,701 A | | 12/1988 | Baubles |
| 4,863,327 A | | 9/1989 | Poupiter |
| 4,875,816 A | | 10/1989 | Peterson |
| 4,883,397 A | * | 11/1989 | Dubost ....................... 411/174 |
| 5,096,350 A | * | 3/1992 | Peterson ...................... 411/12 |
| 5,893,694 A | | 4/1999 | Wilusz et al. |
| 6,146,071 A | | 11/2000 | Norkus et al. |
| 6,644,902 B1 | * | 11/2003 | Cutshall ..................... 411/111 |

* cited by examiner

Primary Examiner—William L. Miller
(74) Attorney, Agent, or Firm—Harness, Dickey & Pierce, P.L.C.

(57) ABSTRACT

A cage is adapted to hold the nut. The cage is formed from a sheet of material into top, bottom, and side walls. A protrusion extends between adjacent walls and is formed from repositioned material and/or an expanded portion of the sheet of material. The protrusion resists angular movement between the adjacent wall segments. The protrusion also pushes against an adjacent surface to resist angular movement. A method of manufacturing includes stamping a blank for a cage from a sheet of material. In addition, the method includes forming a protrusion on the sheet material by repositioning a corresponding area of the sheet material and bending the blank along a line passing through the protrusion and the corresponding groove. In a preferred version of this method, the stamping of the blank and the forming of the protrusion are done as part of a single stamping operation.

23 Claims, 2 Drawing Sheets

(SECTION A-A)

US 6,893,197 B2

CAGED NUT ASSEMBLY WITH REINFORCING PROTRUSIONS

FIELD OF THE INVENTION

The present invention relates to a caged nut assembly.

BACKGROUND OF THE INVENTION

Caged nut assemblies are well known in the art and provide a useful function. For example, they are able to retain the threaded nut in locations that are difficult, or in some cases impossible, to access at the time a threaded bolt is to be inserted into the nut. During assembly and disassembly of the threaded bolt to the caged nut fastener, significant forces can be transmitted to the cage as it retains the nut. This is particularly true where the nut is permitted to float within the cage to account for tolerance variations.

In certain automotive applications, for example, a caged nut assembly is welded to a vehicle component. Thereafter, the vehicle component, including the caged nut assembly, is subject to an e-coating process to protect against corrosion. As a result of the e-coating process, the nut may become adhered to the cage. Significant forces may be applied to the caged nut assembly in order to free the nut from its attachment to the cage so it can once again float.

Several solutions have been offered to prevent the cage from opening up in response to these forces. For example, the thickness of the walls of the cage have been increased to make the walls more rigid. Another solution involves welding cage walls to each other instead of leaving a small space between them. Each of these solutions, however, adds costs by using additional material, and/or by requiring an additional welding step. Consequently, it is desirable to provide a caged nut assembly which is resistant to opening up without unduly increasing costs.

SUMMARY OF THE INVENTION

In accordance with one aspect of the present invention a caged nut assembly is provided. The assembly includes a cage adapted to hold the nut. The cage is formed from a sheet of material into a top wall, a bottom wall, and a side wall therebetween. The cage has a protrusion including repositioned material of the sheet of material and extending at least between a point on the side wall and a point on one of the top wall and the bottom wall.

In accordance with another aspect of the present invention the cage has a sheet of material formed into adjacent wall segments adjoined to each other along a transitional area. The transitional area includes a protrusion formed from an expanded portion of the sheet of material. The protrusion is adapted to resist angular movement of the adjacent wall segments.

In accordance with another aspect of the present invention the cage is formed from a sheet of material into a bottom wall and an adjoining side wall. At least one of these walls has a protrusion adapted to push against an adjacent surface to resist angular movement of the side wall relative to the bottom wall when the caged nut assembly is attached to the adjacent surface.

In accordance with yet another aspect of the present invention a method of manufacturing a caged nut assembly is provided. The method includes stamping a blank for a cage from a sheet of material and forming a protrusion on the sheet material by repositioning a corresponding area of the sheet material. Bending the blank along a line passing through the protrusion and the corresponding groove is also included in the method. In a preferred version of this method, the stamping of the blank and the forming of the protrusion are done as part of a single stamping operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
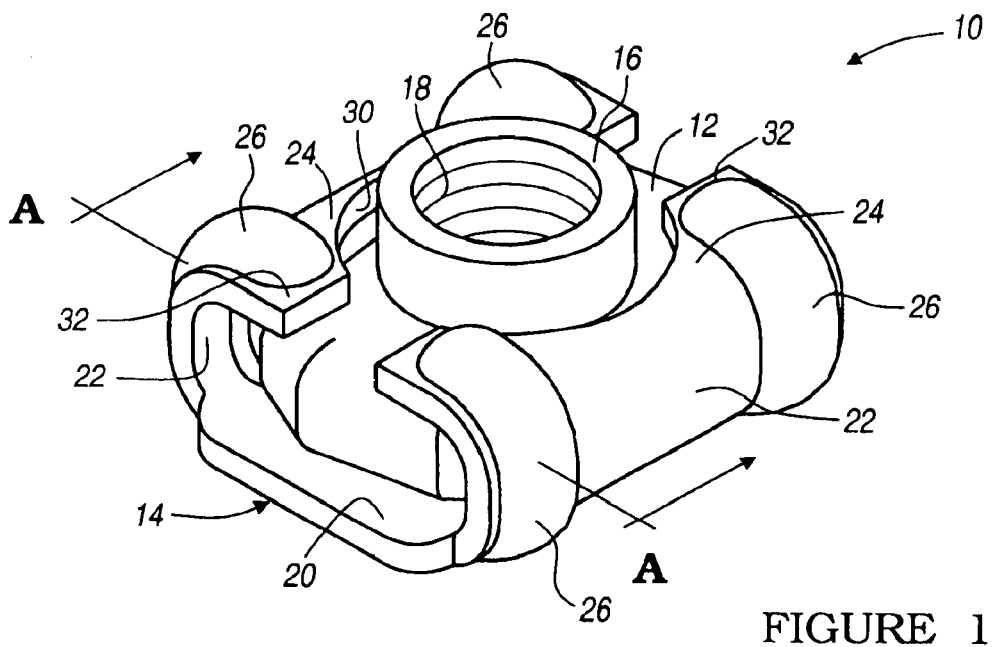
FIG. 1 is a perspective view of a preferred embodiment of a caged nut assembly according to the present invention.

Referring to FIG. 1, a preferred embodiment of a caged nut assembly according to the present invention, indicated generally as 10, is provided. The assembly generally includes a nut 12 and a cage 14. The nut 12 includes an upwardly extending, generally cylindrical wall 16 and includes a threaded aperture 18 surrounded by the cylindrical wall 16. The cage 14 generally includes a bottom wall 20, side walls 22 and a top wall 24. The top wall 24 is formed of two unconnected panels; one extending from each of the side walls 22. The cage 14 also has an elongated, arcuate, expanded protrusion 26 at each corner of the cage 14. The protrusions 26 are adapted to resist angular movement of the top, bottom and side walls relative to each other.

Figure 2:
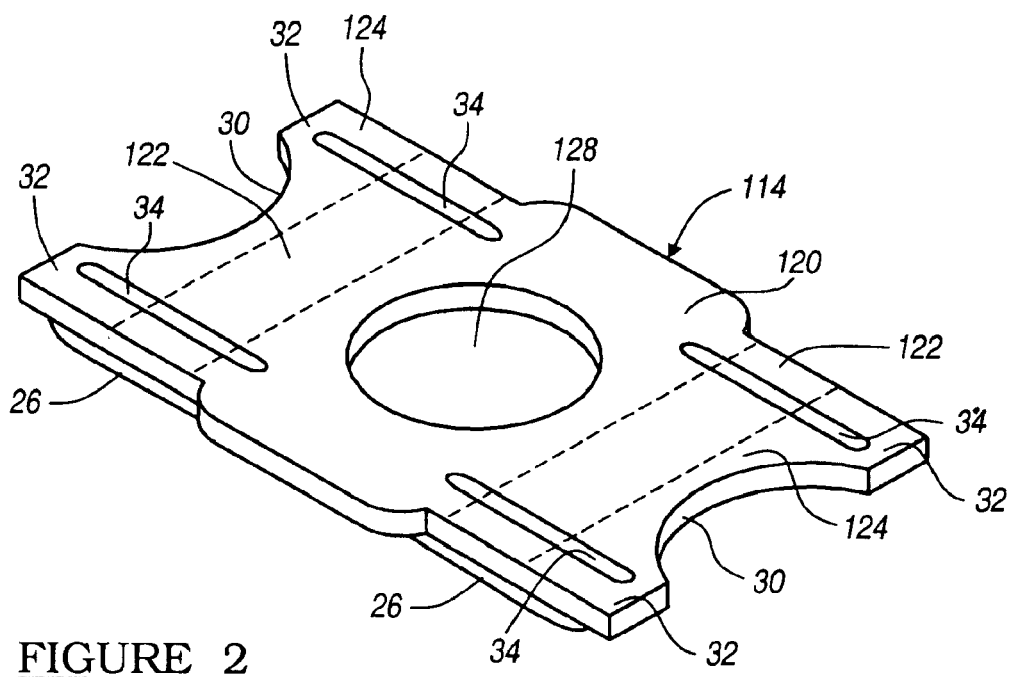
FIG. 2 is a perspective view of a blank cut from a sheet material for the cage of FIG. 1.

Referring to FIG. 2, the cage 14 is formed from a cage blank 114 stamped from a sheet of metal having a substantially uniform thickness. The stamping operation cuts the cage blank 114 from a larger sheet of metal. The cage blank 114 includes a bottom wall panel 120 with an aperture 128 therethrough. This aperture 128 is preferably larger than the threaded aperture 118 of the nut 12 to accommodate for the floating nature of the nut 12. The cage blank 114 also includes side wall panel 122 and top wall panels 124. The top wall panels 124 include a generally semi-circular cut out 30 that creates retaining tabs 32. The retaining tabs 32 cooperate with the upwardly extending cylindrical wall 16 of the nut 12 to help retain the nut 12 within the cage 14 (as seen in FIG. 1).

The cage blank 114 also includes four elongated, expanded protrusions 26. The protrusions 26 are preferably formed during the same stamping operation that also cuts the cage blank 114 from the larger sheet of metal. During the stamping operation, an elongated groove 34 is pressed into one side of the sheet of metal which expands the sheet of metal in the area to form the corresponding protrusion 26 on the opposite side of the sheet of metal. Although the sheet of material is expanded in this area (and thus, thinned slightly), the sheet maintains its substantially constant thickness. In addition to being expanded, a portion of the sheet material is repositioned outward of the wall panels. The groove 34 and corresponding protrusion 22 have an arcuate shape in both the longitudinal and transverse directions.

The cage blank 114 is formed into the cage 14 by one or more bending operations. The bending operations fold the blank 114 in the transition areas (represented by the dotted lines) separating the various wall panels 120, 122, 124. The transition areas pass through the groove 34 and cooperating protrusion 26. Thus, the transition area includes the protrusion 26. Upon completion of the folding operation(s), the blank 114 is folded around the nut 12 to retain it.

The nut 12 is retained in the cage 14 by the bottom wall 20 and the retaining tabs 32. The retaining tabs 32 cooperate with the cylindrical portion 16 of the nut 12 to prevent the nut 12 from falling out the ends of the cage 14. The top wall 24 and the bottom wall 20 prevents the nut 12 from moving out of the cage 14 in the upward and downward direction. Similarly, the cylindrical wall 16 of the nut 12 cooperating with the semi-circular cut out 30 and the side walls 22 prevent the nut 12 from moving out of the cage 14 in the sideways direction. Even though the nut is retained in the cage 14, it is preferably free to move (or float) a limited distance within cage 14 to account for tolerance variations and aid threading the threaded bolt (not shown) through the nut 12.

Figure 3:
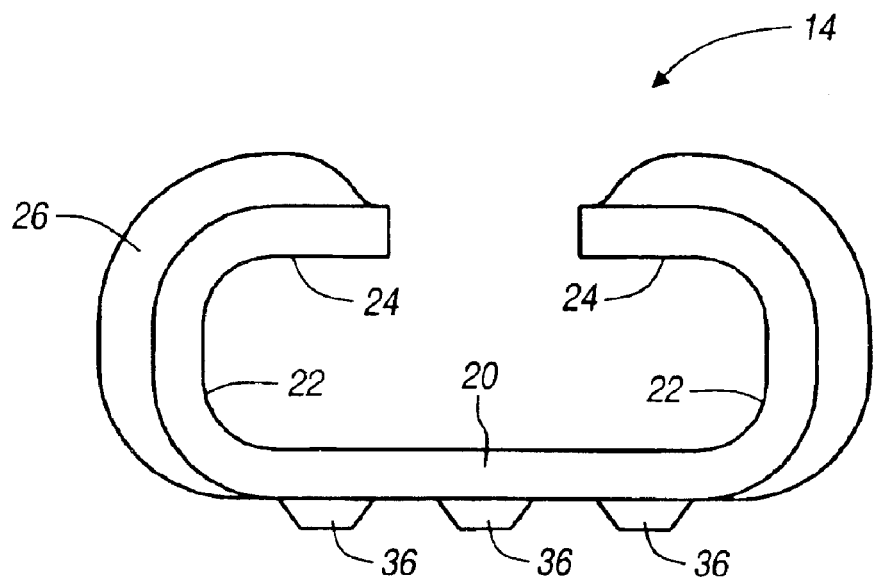
FIG. 3 is an end view of the blank of FIG. 2 after it has been formed up by folding into the cage of FIG. 1.

Referring to FIG. 3, the resulting cage 14 is illustrated with the nut removed for clarity. The bottom wall 20 includes three weld pool projections 36 arranged in a triangular pattern on the bottom wall 20 of the cage 14. These projections 36 provide weld material for use in projection welding the outer surface of the bottom wall 20 of the cage 14 flat against an adjoining wall (not shown). It is evident from this view that, with the cage 14 welded against the adjoining wall, the protrusion 26 in the transition area between the bottom wall 20 and the side walls 22 is adapted to push against the adjacent surface to resist angular movement of the side wall 22 relative to the bottom wall 20.

Figure 4:
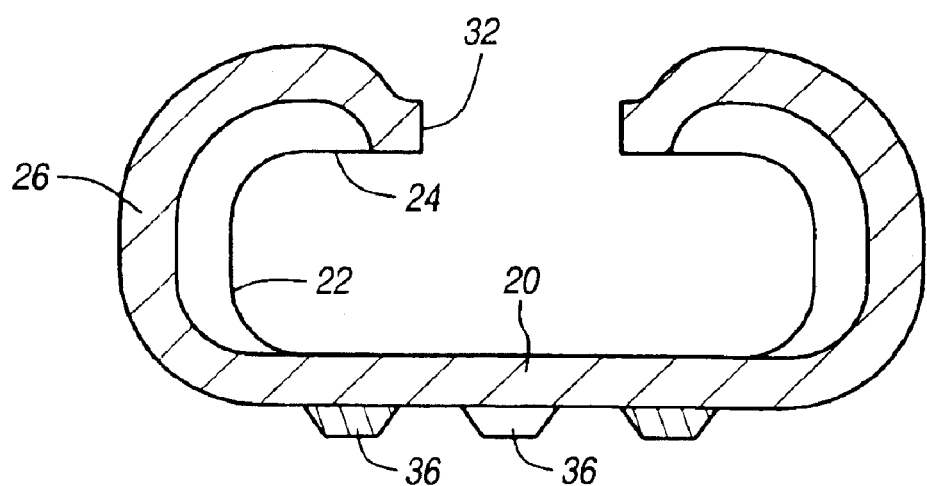
FIG. 4 is a cross sectional view taken along line A—A of FIG. 1, but with the nut removed for clarity as in FIG. 3.

Referring to FIG. 4, the cross-section of the resulting cage 14 illustrates that the sheet material maintains its substantially uniform thickness, even after the stamping and bending operations. Due to the expanding and repositioning of the material outwardly of the remainder of the cage wall 20, 22, 24, the projections 26 increase resistance to angular movement of the side wall 22 relative to the bottom wall 20 and the top wall 24. This is also due, in part, to the fact that the protrusions 26 extend at least from a point on one wall of the cage 14 to a point on an adjacent wall of the cage 14.

Returning to FIGS. 1 through 3, each of the four protrusions 26 originates at a point on the top wall 24; and more particularly, at a point within the tabs 32 of the top wall 24. Each protrusion 26 extends continuously from this point, through the side wall 22, and ends at a point on the bottom wall 20 in the transition area between the bottom wall 20 and the side wall 22. Thus, each protrusion 26 extends at least between a point on the side wall 26 and a point on the top wall 24 and the bottom wall 20. Thus, as indicated above, the outwardly repositioned material of the protrusions 26 resists angular movement of the side wall 22 relative to the top wall 24 and the bottom wall 20.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A caged nut assembly comprising:
   a nut; and
   a cage adapted to hold the nut being formed from a sheet of material into a top wall, a bottom wall, and a side wall therebetween, the cage having a protrusion including repositioned material of the sheet of material, the protrusion extending at least between a point on the side wall and a point on the bottom wall.

2. A caged nut assembly according to claim 1, wherein the sheet of material has a substantially uniform thickness.

3. A caged nut assembly according to claim 1, further comprising a plurality of weld pools on the bottom wall.

4. A caged nut assembly according to claim 1, wherein the protrusion has an elongated, arcuate shaped outer surface.

5. A caged nut assembly according to claim 1, wherein the protrusion originates at a point on the top wall, extends continuously through the side wall, and ends at a point on the bottom wall.

6. A caged nut assembly according to claim 1, wherein the top wall is formed of two unconnected panels and each panel includes a retaining tab adapted to retain the nut within the cage.

7. A caged nut assembly according to claim 6, wherein the protrusion extends into the retaining tab.

8. A caged nut assembly according to claim 1, wherein the protrusion is adapted to push against an adjacent surface when the caged nut assembly is attached thereto.

9. A caged nut assembly comprising:
   a nut; and
   a cage adapted to retain the nut, the cage having a sheet of material formed into a bottom wall and a side wall adjoined to each other along a transitional area, the transitional area including a protrusion formed from an expanded portion of the sheet of material, the protrusion being adapted to resist angular movement of the side wall and the bottom wall relative to each other.

10. A caged nut assembly according to claim 9, wherein the sheet of material has a substantially uniform thickness.

11. A caged nut assembly according to claim 9, further comprising a plurality of weld pools on the bottom wall.

12. A caged nut assembly according to claim 9, wherein the protrusion has an elongated, arcuate shaped outer surface.

13. A caged nut assembly according to claim 9, wherein the sheet material is further formed into a top wall adjoined to the side wall along a second transitional area and, wherein the protrusion extends continuously through the side wall and into both the transitional area and the second transitional area.

14. A caged nut assembly according to claim 9, wherein the sheet material is further formed into a top wall adjacent the side wall and wherein the top wall is formed of two unconnected panels and each panel includes a retaining tab adapted to retain the nut within the cage.

15. A caged nut assembly according to claim 14, wherein the protrusion extends into the retaining tab.

16. A caged nut assembly according to claim 9, wherein the protrusion is adapted to push against an adjacent surface when the caged nut assembly is attached thereto.

17. A caged nut assembly comprising:
   a nut; and
   a cage adapted to hold the nut, the cage formed from a sheet of material into a bottom wall and an adjoining a side wall, at least one of the walls having a protrusion adapted to push against an adjacent surface when the caged nut assembly is attached thereto to resist angular movement of the side wall relative to the bottom wall;

wherein the cage further comprises a top wall formed from the sheet of material adjacent the side wall, and wherein the protrusion originates at a point on the top wall, extends continuously through the side wall, and ends at a point on the bottom wall.

18. A caged nut assembly according to claim 17, wherein the sheet of material has a substantially uniform thickness.

19. A caged nut assembly according to claim 17, further comprising a plurality of weld pools on the bottom wall.

20. A caged nut assembly according to claim 17, wherein the protrusion has an elongated, arcuate shaped outer surface.

21. A caged nut assembly according to claim 17, wherein the top wall has a retaining tab adapted to retain the nut within the cage.

22. A caged nut assembly according to claim 21, wherein the protrusion extends into the retaining tab.

23. A caged nut assembly according to claim 22, wherein the cage is adapted to allow the nut to move within the cage.

* * * * *